(12) United States Patent
Mizutani et al.

(10) Patent No.: US 9,462,143 B2
(45) Date of Patent: Oct. 4, 2016

(54) NON-TRANSITORY COMPUTER-READABLE MEDIUM STORING PROGRAMS FOR INFORMATION PROCESSING APPARATUS, INFORMATION PROCESSING APPARATUS, AND INFORMATION PROCESSING METHOD

(71) Applicant: BROTHER KOGYO KABUSHIKI KAISHA, Nagoya-shi, Aichi-ken (JP)

(72) Inventors: Aiko Mizutani, Nagoya (JP); Kenji Tamaki, Ichinomiya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/665,976

(22) Filed: Mar. 23, 2015

(65) Prior Publication Data

US 2015/0281481 A1    Oct. 1, 2015

(30) Foreign Application Priority Data

Mar. 31, 2014    (JP) .................................. 2014-074321

(51) Int. Cl.
*G06K 7/10*    (2006.01)
*G06K 9/22*    (2006.01)
*H04N 1/00*    (2006.01)

(52) U.S. Cl.
CPC ...... *H04N 1/00458* (2013.01); *H04N 1/00238* (2013.01); *H04N 1/00392* (2013.01); *H04N 1/00395* (2013.01); *H04N 1/00482* (2013.01)

(58) Field of Classification Search
CPC ........ H04N 1/3873; H04N 1/04; H04N 1/46; H04N 1/40
See application file for complete search history.

(56) References Cited

U.S. PATENT DOCUMENTS

| | | | | |
|---|---|---|---|---|
| 8,913,285 | B1 * | 12/2014 | Neubrand | H04N 1/3873 358/1.9 |
| 2002/0054401 | A1 * | 5/2002 | Sasaki | H04N 1/00236 358/538 |
| 2007/0139704 | A1 * | 6/2007 | Ogura | H04N 1/00 358/1.15 |
| 2009/0201553 | A1 * | 8/2009 | Kanamori | H04N 1/00225 358/1.16 |
| 2014/0063547 | A1 * | 3/2014 | Sakurai | G06F 3/1211 358/1.15 |
| 2015/0156255 | A1 * | 6/2015 | Saito | G06F 3/0481 715/733 |

FOREIGN PATENT DOCUMENTS

JP    2011-166767 A    8/2011

* cited by examiner

*Primary Examiner* — Thien T Mai
(74) *Attorney, Agent, or Firm* — Merchant & Gould P.C.

(57) ABSTRACT

A medium stores computer-executable programs. The programs cause an information processing apparatus including a communication unit communicable with a scanner to perform: displaying a first window including a first icon which causes the scanner to execute a scanning process; judging whether a selection operation to the first icon is performed; transmitting a scan command to the scanner in a case that the information processing apparatus judges that the selection operation to the first icon is performed; receiving scan data from the scanner via the communication unit as a response to the scan instruction; and displaying a second window, on a display unit, which displays an image based on the scan data received from the scanner.

13 Claims, 13 Drawing Sheets

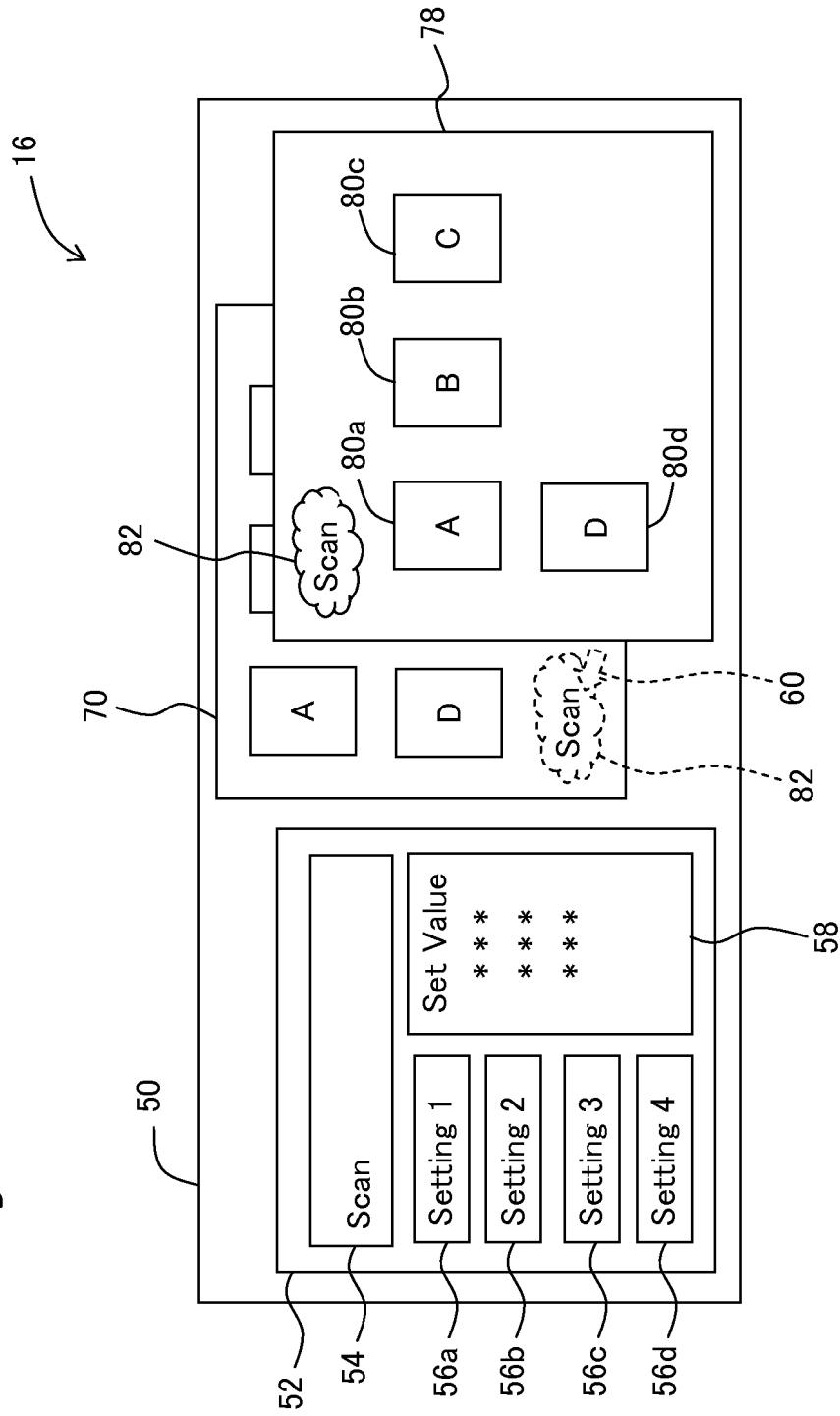

NON-TRANSITORY COMPUTER-READABLE MEDIUM STORING PROGRAMS FOR INFORMATION PROCESSING APPARATUS, INFORMATION PROCESSING APPARATUS, AND INFORMATION PROCESSING METHOD

CROSS REFERENCE TO RELATED APPLICATION

The present application claims priority from Japanese Patent Application No. 2014-074321 filed on Mar. 31, 2014 the disclosure of which is incorporated herein by reference in its entirety.

BACKGROUND

1. Field of the Invention

The present invention relates to a control program and the like which can be read by a computer of an information processing apparatus including a display unit and a communication unit capable of communication with a scanning device.

2. Description of the Related Art

An information processing apparatus, which includes a display unit and a communication unit capable of communication with a scanning device, acquires scan data from the scanning device and displays images based on the acquired scan data on a display screen of a display unit. By virtue of this, it is possible for a user to confirm the images based on the scan data. Japanese Patent Application Laid-open No. 2011-166767 discloses one example of such kind of information processing apparatus.

SUMMARY

According to the information processing apparatus disclosed in Japanese Patent Application Laid-open No. 2011-166767, it is possible for the user to carry out confirmation, correction and the like of the images based on the scan data. However, with the information processing apparatus disclosed in Japanese Patent Application Laid-open No. 2011-166767, when acquiring new scan data different from the scan data of the images displayed previously, the images displayed previously are no longer displayed whereas the images based on the newly acquired scan data are displayed on the display screen. However, for example, there is a poor operability for the user who desires to view and compare the images displayed previously and the images based on the scan data newly acquired. Accordingly, the present teaching is made in view of such kind of situation, and an object thereof is to improve the operability in a scanning process.

According to a first aspect of the present teaching, there is provided a non-transitory computer-readable medium storing computer-executable programs that, when executed by a processor, cause an information processing apparatus including: a display unit; an operation unit configured to output a signal depending on a user operation; and a communication unit configure to communicate with a scanner, to perform: displaying a first window on the display unit, the first window including a first icon which causes the scanner to execute scanning process; judging whether a selection operation to the first icon is performed based on the signal outputted from the operation unit; in a case that the information processing apparatus judges that the selection operation to the first icon is performed, transmitting a scan instruction to the scanner via the communication unit; receiving scan data from the scanner via the communication unit as a response to the scan instruction; and displaying a second window on the display unit, the second window displaying an image based on the scan data received from the scanner, wherein in a case that the information processing apparatus judges that second selection operation to the first icon is performed after displaying the second window on the display unit, the programs cause the information processing apparatus to display another second window on the display unit together with the second window which has been displayed on the display unit, the another second window displaying another image based on another scan data generated by the scanning process executed after the second selection operation to the first icon.

According to a second aspect of the present teaching, there is provided an information processing apparatus including: a display unit; an operation unit configured to output a signal depending on a user operation; a communication unit configure to communicate with a scanner; and a controller configured to: display a first window on the display unit, the first window including a first icon which causes the scanner to execute scanning process; judge whether a selection operation to the first icon is performed based on the signal outputted from the operation unit; in a case that the controller judges that the selection operation to the first icon is performed, transmit a scan instruction to the scanner via the communication unit; receive scan data from the scanner via the communication unit as a response to the scan instruction; and display a second window on the display unit, the second window displaying an image based on the scan data received from the scanner, wherein in a case that the controller judges that second selection operation to the first icon is performed after displaying the second window on the display unit, the controller is configured to display another second window on the display unit together with the second window which has been displayed on the display unit, the another second window displaying another image based on another scan data generated by the scanning process executed after the second selection operation to the first icon.

According to a third aspect of the present teaching, there is provided an information processing method to be executed by an information processing apparatus provided with: a display unit; an operation unit configured to output a signal depending on a user operation; and a communication unit configure to communicate with a scanner, the method including: displaying a first window on the display unit, the first window including a first icon which causes the scanner to execute scanning process; judging whether a selection operation to the first icon is performed based on the signal outputted from the operation unit; in a case that the information processing apparatus judges that the selection operation to the first icon is performed, transmitting a scan instruction to the scanner via the communication unit; receiving scan data from the scanner via the communication unit as a response to the scan instruction; and displaying a second window on the display unit, the second window displaying an image based on the scan data received from the scanner, wherein in a case that the information processing apparatus judges that second selection operation to the first icon is performed after displaying the second window on the display unit, the information processing apparatus displays another second window on the display unit together with the second window which has been displayed on the display unit, the another second window displaying another image based on another scan data generated by the scanning process executed after the second selection operation to the first icon.

According to the above aspects of the present teaching, the scanner carries out the scanning process in a case that the display unit displays the first window including the first icon for the scanner to carry out the scanning process, and the selection operation to the first icon is performed. Then, the scan data generated through the scanning process is sent to the information processing apparatus, and the display unit displays the second window including the image based on the scan data. Further, in a case that the second selection operation to the first icon is performed in a state that the second window is displayed on the display unit, the scanner carries out another scanning process to transmit, to the information processing apparatus, another scan data generated through the another scanning process. Then, the display unit displays another second window including another image based on the another scan data, together with the second window being already displayed. By virtue of this, it is possible to browse and compare the image being already displayed and the another image based on the newly acquired another scan data, so as to improve the operability for the scanning process.

BRIEF DESCRIPTION OF THE DRAWINGS

FIG. 8 is a diagram showing a state of having carried out a drag operation on a successive scan icon from the second preview window to the first preview window.

DESCRIPTION OF THE EMBODIMENT

Configuration of a Communication System

Figure 1:
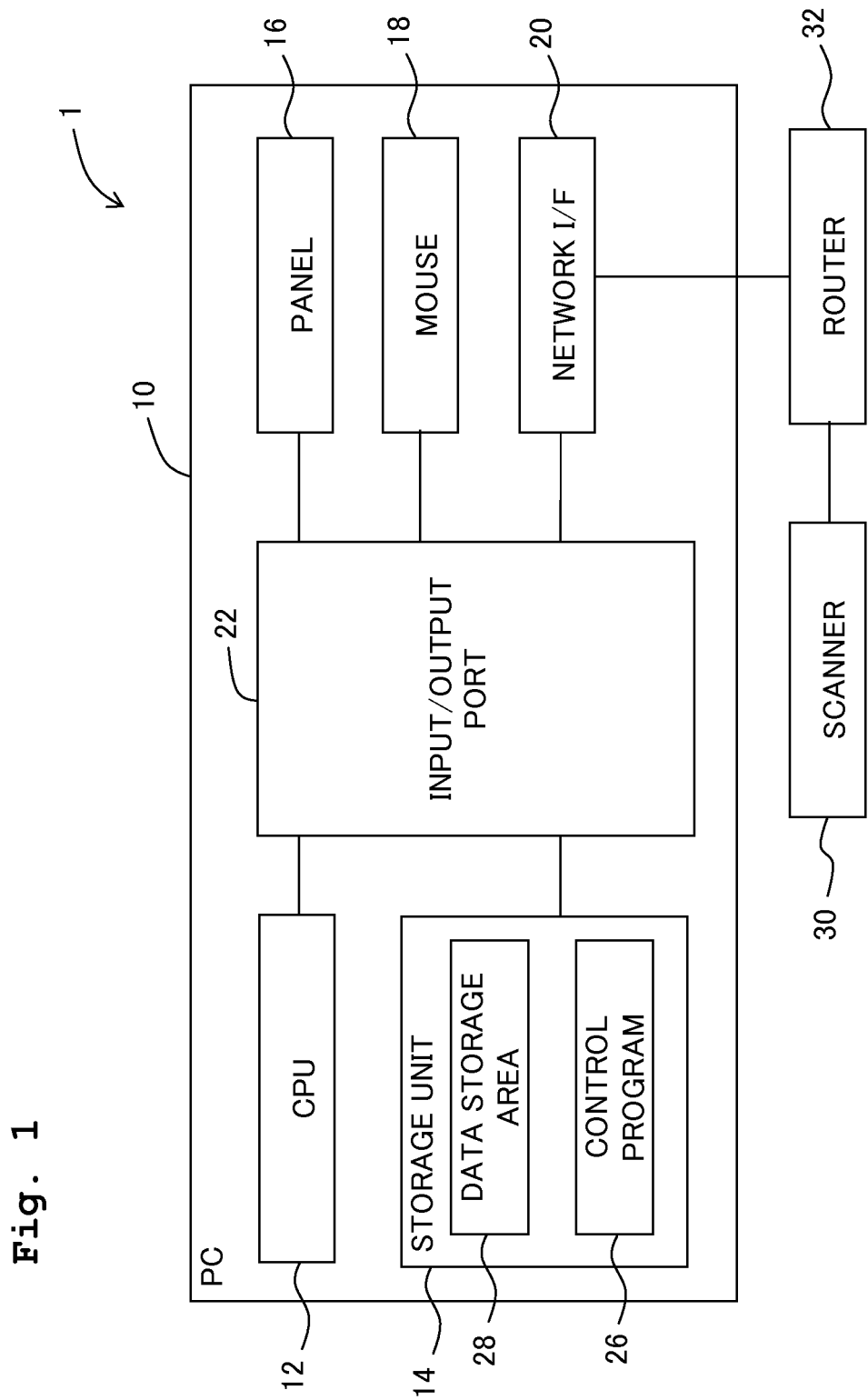
FIG. 1 is a block diagram of a communication system according to an embodiment of the present teaching.

As shown in FIG. 1, a communication system 1, which is exemplified as a first embodiment of the present teaching, includes a PC 10 (the abbreviation of Personal Computer; an example of the information processing apparatus of the present teaching), a scanner 30, and a router 32.

The PC 10 primarily includes a CPU 12 (the abbreviation of Central Processing Unit; an example of the controller and/or computer of the present teaching), a storage unit 14, a panel 16 (an example of the display unit of the present teaching), a mouse 18 (an example of the operation unit of the present teaching), and a network I/F 20 (an example of the communication unit of the present teaching). Those components are communicable with one another via an input/output port 22.

The network I/F 20 is configured to communicate with external devices via the router 32. In the first embodiment, the network I/F 20 is connected to the scanner 30 via the router 32. By virtue of this, it is possible for the PC 10 to transmit and receive various data to and from the scanner 30.

The panel 16 has a screen, and is adapted to display on the screen images and the like based on image data. The mouse 18 is a device for moving a pointer displayed on the screen of the panel 16. The mouse 18 is adapted to accept users' drag operation, clicks and the like and to output a signal according to an accepted operation.

The CPU 12 carries out processes according to a control program 26 in the storage unit 14 (an example of the control program of the present teaching). The control program 26 is provided for the scanner 30 to carry out a scanning process. Hereinafter, the CPU 12 may also be referred to simply as a program name as to execute the program such as the control program 26 or the like. For example, the term "the control program 26" may mean "the CPU 12 executing the control program 26".

The storage unit 14 is constructed by combining a RAM (the abbreviation of Random Access Memory), a ROM (the abbreviation of Read Only Memory), a flash memory, an HDD (the abbreviation of Hard Disk Drive), a buffer included in the CPU 12, etc. Further, the storage unit 14 includes a data storage area 28 (an example of the storage unit of the present teaching). The data storage area 28 is adapted to store the scan data acquired from the scanner 30, the data needed to execute the control program 26, etc.

<Successive Scanning Process>

In the communication system 1, the scanner 30 carries out a scanning process according to a scan command from the PC 10, and a scan data is generated through the scanning process and sent to the PC 10. On this occasion, if the scanner 30 collectively scans at least one page of a document, then the scan data of the at least one page of the document is stored in the PC 10 as one group of scan data (to be referred to below as "scan data group" from time to time). Then, if the user desires to add a new scan data to that scan data group, then the successive scanning process is carried out. That is, for example, after scanning at least one page of a document and letting the PC 10 store the scan data of the at least one page of the document, if it is desired to store the scan data of a new document together with the scan data of the previously scanned document, then the successive scanning process is carried out. This associates and stores the scan data of the new document and the scan data of the previously scanned document.

Figure 2:
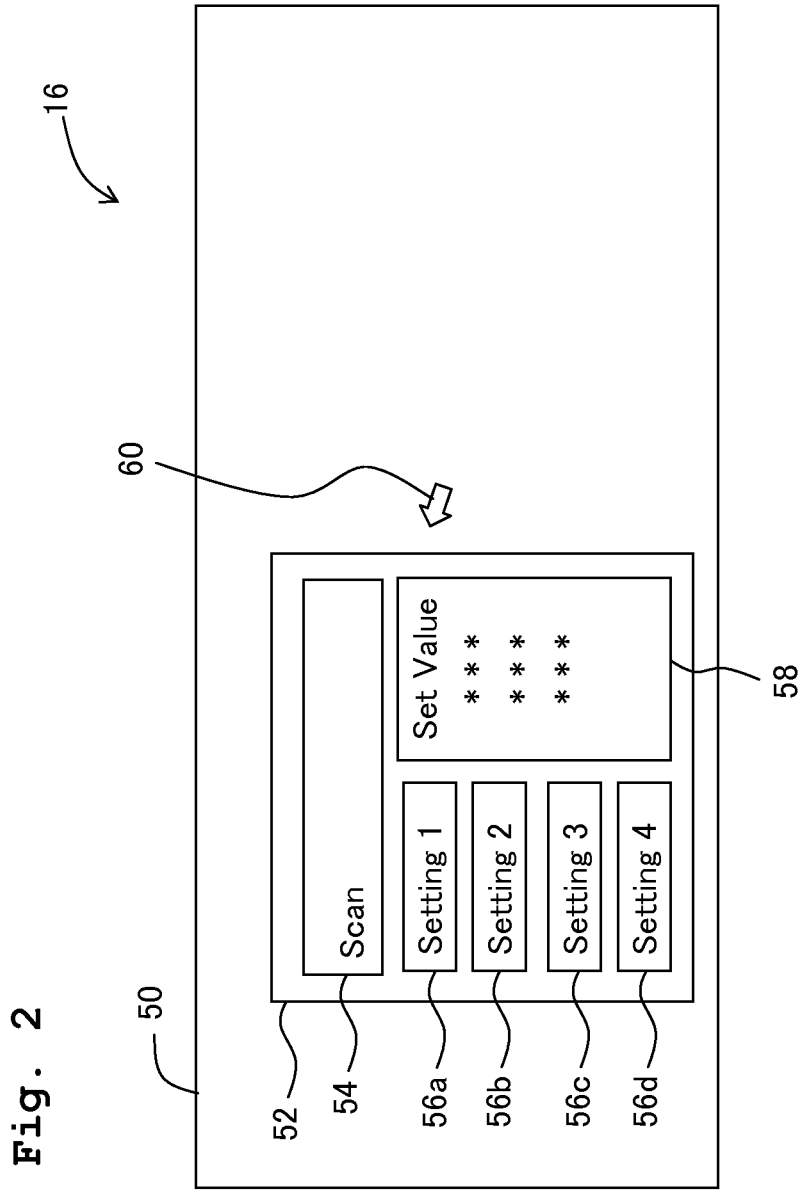
FIG. 2 is a diagram showing a main window.

As shown in FIG. 2, if the PC 10 executes the control program 26, then a display screen 50 of the panel 16 displays a main screen 52 (an example of the first screen of the present teaching). The main screen 52 displays a main scan icon 54 (an example of the first icon of the present teaching), four setting selection buttons 56a, 56b, 56c and 56d, and a set value display column 58. The main scan icon 54 is provided for carrying out the scanning process. The setting selection buttons 56 are provided for selecting a scan setting for the scanning process, and a set value is set to each of the setting selection buttons 56 for the scanning process. After a mouse operation is carried out to move a pointer 60 onto the main scan icon 54 or any of the setting selection buttons 56, it is possible for the user to carry out a selecting operation on any of the main scan icon 54 and setting selection buttons 56 by way of, for example, a left click of the mouse.

Further, simply the left click on a button or the like may be used to refer to the mouse operation of first moving the pointer 60 onto an image such as the main scan icon 54 or the like displayed on the panel 16, and then carrying out the left click. Further, the set value display column 58 displays the set value currently set for the scanning process. That is, if the left click is carried out on any one of the four setting selection buttons 56a to 56d, then the set value display column 58 displays the set value set according to the operated button.

In the main screen 52, if the left click is carried out on the main scan icon 54, then a scan command is sent from the PC 10 to the scanner 30. On this occasion, the scan command is sent to the scanner 30 together with the set value according to the selected button among the four setting selection buttons 56a to 56d. That is, the PC 10 transmits the scan command according to a predetermined set value to the scanner 30. Further, at least one sheet of a document is set on an ADF (the abbreviation of Auto Document Feeder; not shown) or a flat head (not shown) of the scanner 30.

On receiving the scan command designating a predetermined set value, the scanner 30 carries out the scanning process according to the set value, and then transmits to the PC 10 the scan data generated through the scanning process. On receiving the scan data, the PC 10 lets the data storage area 28 store the received scan data as a scan data group. In particular, if the scan data is in JPEG format, then because a plurality of pages of a document are scanned to form a plurality of data in JPEG format, those plurality of data in JPEG format are stored collectively in one folder as the scan data group. Further, if the scan data is in PDF format, then because the plurality of pages of the document are scanned to form one data in PDF format to bring together a plurality of scan data, that one data in PDF format is stored as the scan data group.

Figure 3:
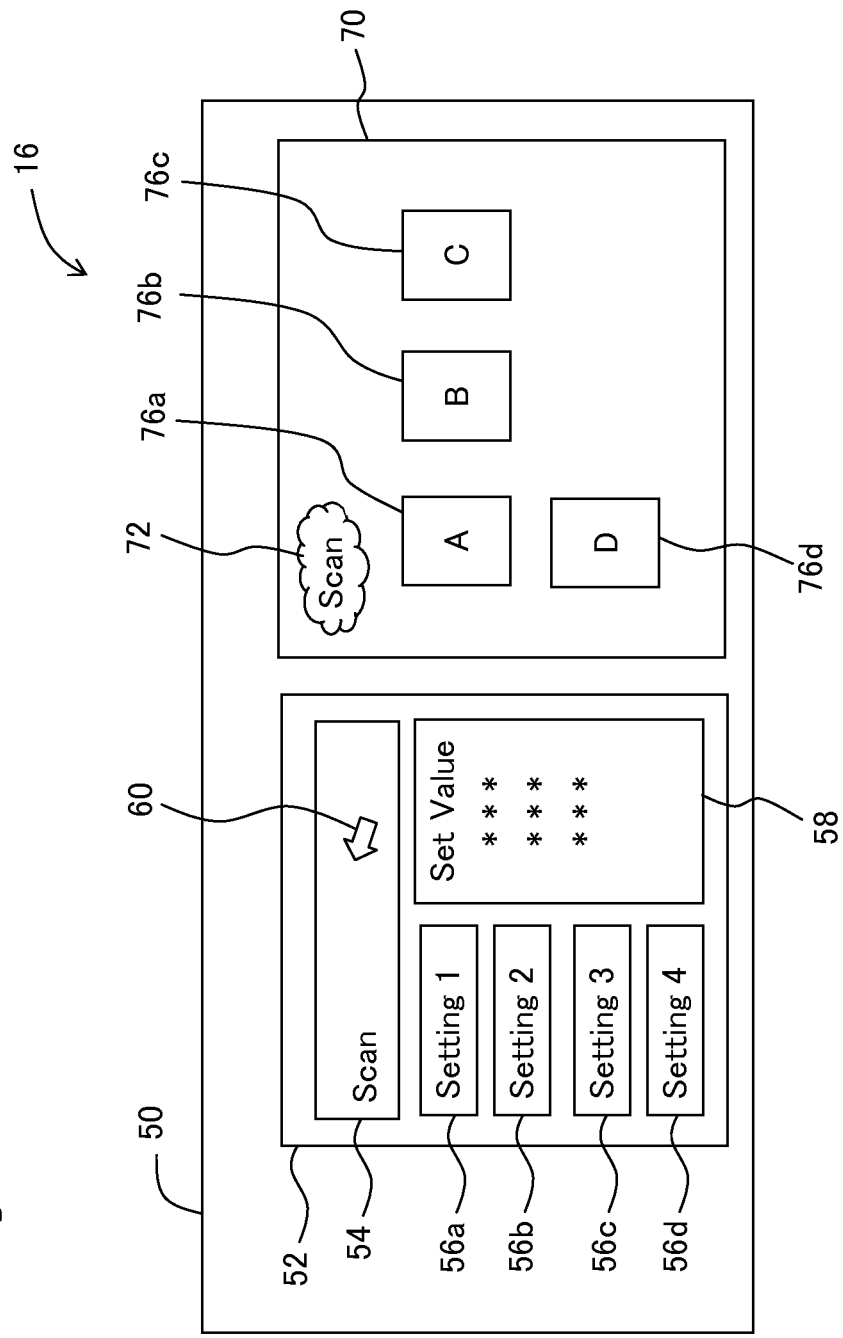
FIG. 3 is a diagram showing the main window and a first preview window.

Further, on receiving the scan data from the scanner 30, the PC 10 displays a preview screen 70 (an example of the second screen of the present teaching) adjacent to the main screen 52 of the display screen 50 of the panel 16 as shown in FIG. 3. The preview screen 70 displays therein images 76 based on the received scan data. The preview screen 70 in FIG. 3 displays four images 76a, 76b, 76c and 76d. Further, the preview screen 70 also displays a successive scan icon 72 (an example of the second icon of the present teaching). The successive scan icon 72 is provided for carrying out the successive scanning process.

As described earlier on, the successive scanning process is carried out when it is desired to store the scan data of a new document together with the scan data group based on the scanning process carried out previously (to be referred to below as "existing scan data" from time to time). After the document to be added is set on the ADF (the abbreviation of Auto Document Feeder; not shown) or the flat head (not shown) of the scanner 30, if the left click is carried out on the successive scan icon 72 in the preview screen 70, then the scan command is sent from the PC 10 to the scanner 30. On this occasion, while a set value for the scanning process is also sent together with the scan command, the set value for the scanning process is set to correspond to the preview screen 70.

In detail, when the images are displayed on the preview screen 70, the preview screen 70 is associated with the set value for the scanning process to generate the scan data of the latest images displayed on the preview screen 70, to let the data storage area 28 store the both. That is, for example, the scan data of the images 76, which are the latest displayed on the preview screen 70 shown in FIG. 3, is generated through the scanning process carried out by operating the main scan icon 54 of FIG. 2, and the set value for the scanning process is set according to the setting selection button 56 selected in the main screen 52 of FIG. 2. Therefore, when the images 76 are displayed in the preview screen 70, the preview screen 70 is associated with the set value according to the setting selection button 56 selected in the main screen 52 of FIG. 2, and then the data storage area 28 stores the both. Then, if the left click is carried out on the successive scan icon 72 of the preview screen 70, then the set value associated and stored with the preview screen 70 is extracted from the data storage area 28. Then, the extracted set value is sent to the scanner 30 together with the scan command. By virtue of this, without settings and the like for the successive scanning process, it is still possible to carry out the scanning process for an additional document at the same set value as that for the existing scan data.

On receiving the scan command according to a predetermined set value, the scanner 30 carries out the scanning process according to the set value, and then transmits the scan data generated through the scanning process to the PC 10. On receiving the scan data, the PC 10 associates the scan data (to be referred to below as "successive scan data" from time to time) with the existing scan data, that is, the scan data of the images 76 displayed in the preview screen 70, and then lets the data storage area 28 store the both as a group of scan data. In particular, if the scan data is in JPEG format, then the successive scan data is stored in the folder storing the existing scan data. By virtue of this, the data in the folder are stored as a scan data group. Further, if the scan data is in PDF format, then the existing scan data is coupled with the successive scan data, and the one data in PDF format is stored as a scan data group.

Figure 4:
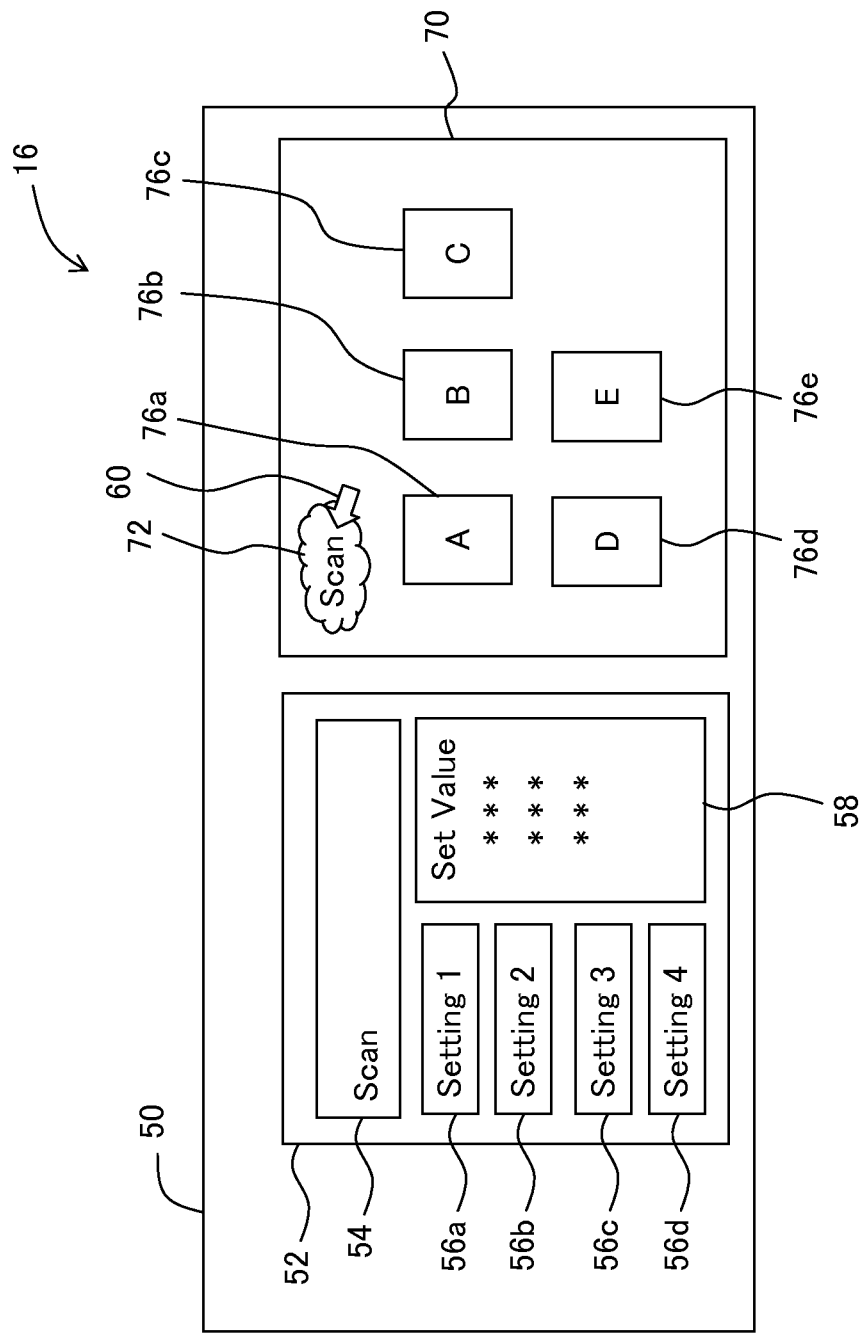
FIG. 4 is a diagram showing a state of displaying an image based on successive scan data in the first preview window of FIG. 3.

Further, on receiving successive scan data from the scanner 30, as shown in FIG. 4, the PC 10 lets the preview screen 70 display an image 76e based on the successive scan data, together with the images 76a, 76b, 76c and 76d based on the existing scan data. In this manner, on the PC 10, by only operating the successive scan icon 72 displayed in the preview screen 70, it is possible to easily add a new scan data to the existing data of the images 76 displayed in the preview screen 70.

Figure 5:
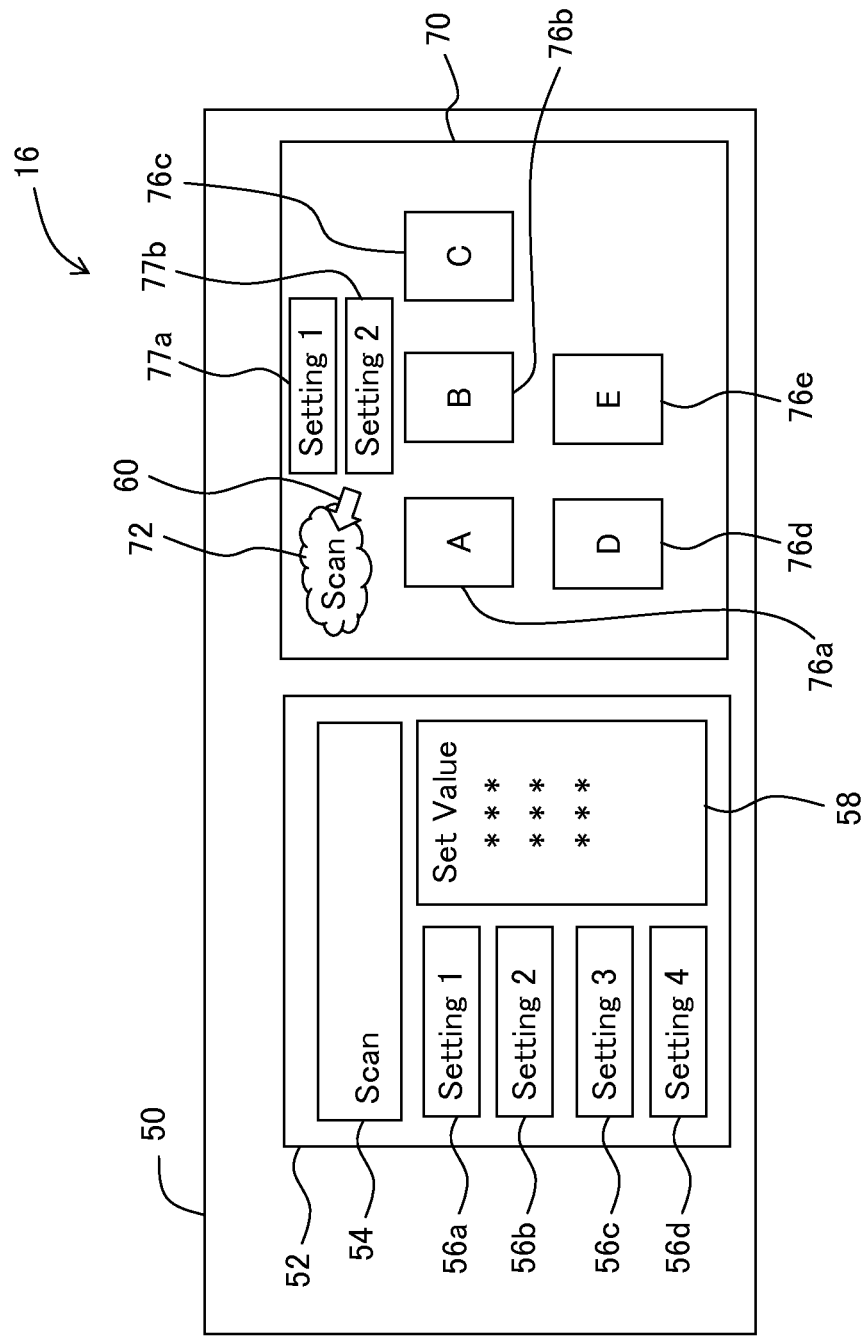
FIG. 5 is a diagram showing a state of displaying setting alteration buttons in the first preview window of FIG. 4.

Further, in the successive scanning process described above, while the set value in the scanning process for an additional document is the same as the set value for the existing scan data, it is also possible to carry out the scanning process for an additional document with a different set value from that for the existing scan data. In detail, by a mouse operation to move the pointer 60 onto the successive scan icon 72 of the preview screen 70, and then carry out the right click, as shown in FIG. 5, setting alteration buttons 77a and 77b are displayed adjacent to the successive scan icon 72. The setting alteration buttons 77a and 77b are provided for changing the set value for the successive scanning process to set the set value for the scanning process according to each of the setting alteration buttons 77a and 77b. By carrying out the left click on any of the setting alteration buttons 77a and 77b, the set value for the successive scanning process is changed to the set value according to the operated button. Then, by carrying out the left click on the successive scan icon 72, the successive scanning process is carried out according to the changed set value. Further, if the set value for the successive scanning process has been changed, then operating any of the setting alteration buttons 77a and 77b updates, to the changed set value, the set value for the successive scanning process stored in association with the preview screen 70.

Further, on the PC 10, it is possible to store another scan data group as distinguished from the scan data group of the images 76 displayed in the preview screen 70, and to display the images based on the other scan data group in another preview screen than the preview screen 70. On such an occasion, the display screen 50 of the panel 16 displays the other preview screen, and the preview screen 70 and main screen 52 displayed previously.

In particular, when the display screen 50 of the panel 16 displays the main screen 52 and the preview screen 70, by carrying out the left click on the main scan icon 54 of the main screen 52, the scan command is sent from the PC 10 to the scanner 30. On this occasion, together with the scan command, the set value according to the selected setting selection button 56 is also sent to the scanner 30. On receiving the predetermined set value and the scan command, the scanner 30 carries out the scanning process according to that set value, and then transmits the scan data generated through the scanning process to the PC 10. On receiving the scan data, the PC 10 lets the data storage area 28 store the received scan data as a scan data group. On this occasion, the data storage area 28 stores the received scan data group as distinguished from the scan data group based on the scanning process carried out previously.

In particular, if the scan data is in JPEG format, then the newly received scan data group is stored in another folder than the folder of storing the scan data group based on the scanning process carried out previously. Further, if the scan data is in PDF format, then the newly received scan data group is one data in PDF format, and is stored as another scan data group than the one data in PDF format based on the scanning process carried out previously.

In this manner, on the PC 10, by operating the main scan icon 54, it is possible to let the data storage area 28 store the scan data group based on a new scanning process as another scan data group than that based on the scan data carried out previously. In this manner, it is possible to create a plurality of types of scan data groups through a simple and easy operation.

Figure 6:
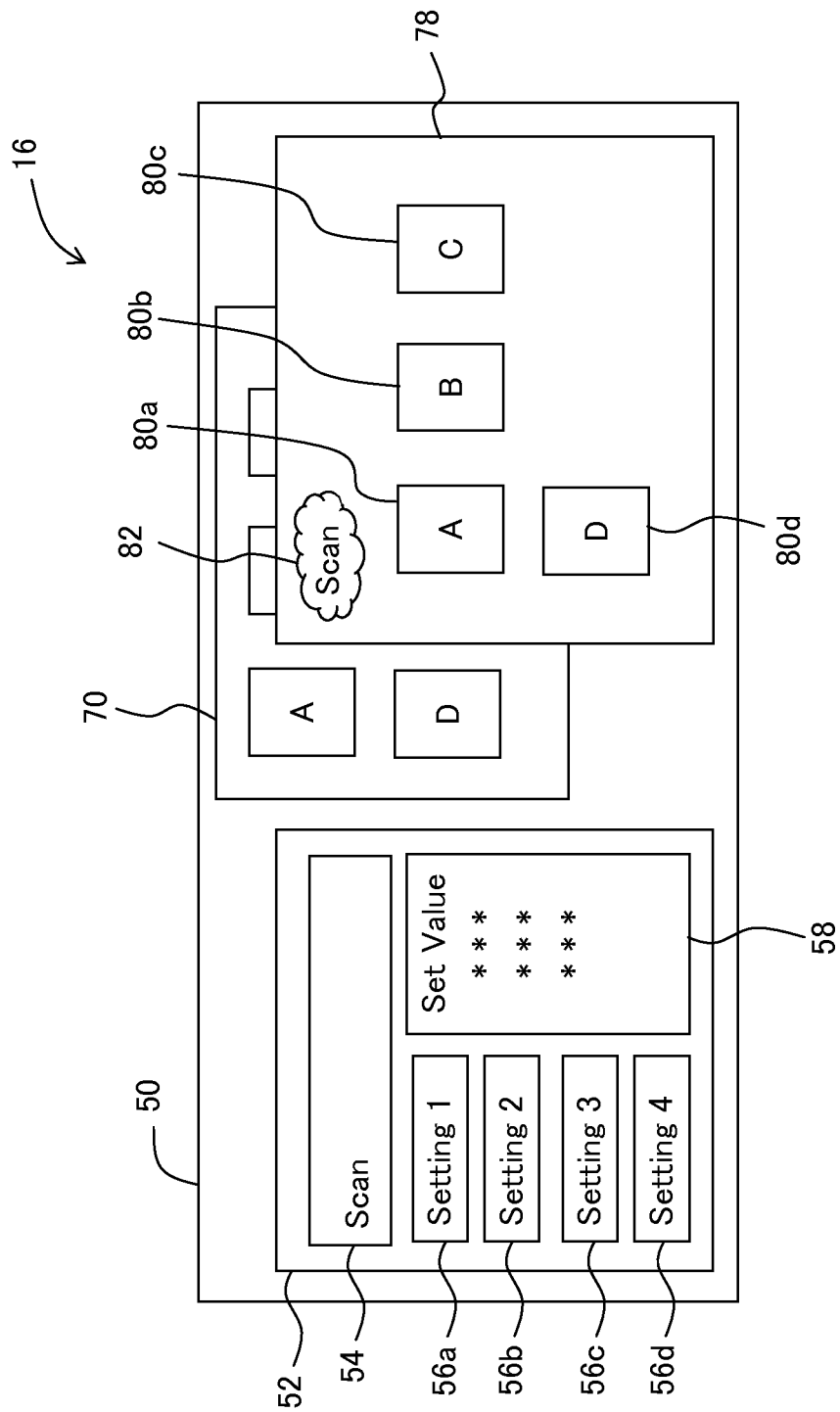
FIG. 6 is a diagram showing the main window, the first preview window, and a second preview window.

Further, on receiving a new scan data group from the scanner 30, the PC 10 lets the display screen 50 of the panel 16 display a preview screen 78 (another example of the second screen of the present teaching) to overlap part of the preview screen 70 as shown in FIG. 6. Further, in order to distinguish the preview screen 70 from the preview screen 78, the preview screen 70 may be referred to as a first preview screen 70, while the preview screen 78 may be referred to as a second preview screen 78. The second preview screen 78 displays images 80 based on the received scan data group. The second preview screen 78 in FIG. 6 displays four images 80a, 80b, 80c and 80d. In this manner, when the PC 10 receives each scan data group based on a new scanning process, the display screen 50 of the panel 16 displays a preview screen for displaying images based on that scan data group. On such an occasion, the display screen 50 displays the main screen 52 and the preview screen displayed previously, together with a new preview screen. By virtue of this, it is possible for the user to easily browse the acquired scan data groups in a plurality of preview screens. Further, because the main screen is displayed on the display screen 50 of the panel 16, it is possible to easily carry out a new scanning process.

Further, the second preview screen 78 displays a successive scan icon 82 (an example of the second icon of the present teaching). The successive scan icon 82 has an equivalent function to the successive scan icon 72 described earlier on. That is, by way of the left click on the successive scan icon 82, a successive scanning process is carried out for adding a new scan data to the existing scan data of the images 80 displayed in the second preview screen 78. Further, the data storage area 28 stores a set value associated with the second preview screen 78 for the scanning process. Therefore, when the successive scanning process is carried out by operating the successive scan icon 82, a scanning process is carried out according to the set value for the scanning process stored in association with the second preview screen 78. In this manner, on the PC 10, by only operating the successive scan icon displayed in the preview screen, it is possible to easily add a new scan data to the existing scan data of the images displayed in that preview screen.

Further, as shown in FIG. 6, when the display screen 50 displays the second preview screen 78 to overlap part of the first preview screen 70, it does not display the successive scan icon 72 of the first preview screen 70. By virtue of this, it is possible to reduce the number of icons for the display screen 50 to display, thereby allowing for a better view of the display screen 50. However, by letting the first preview screen 70 be operable, that is, be an active window, the successive scan icon 72 is displayed in the first preview screen 70.

Figure 7:
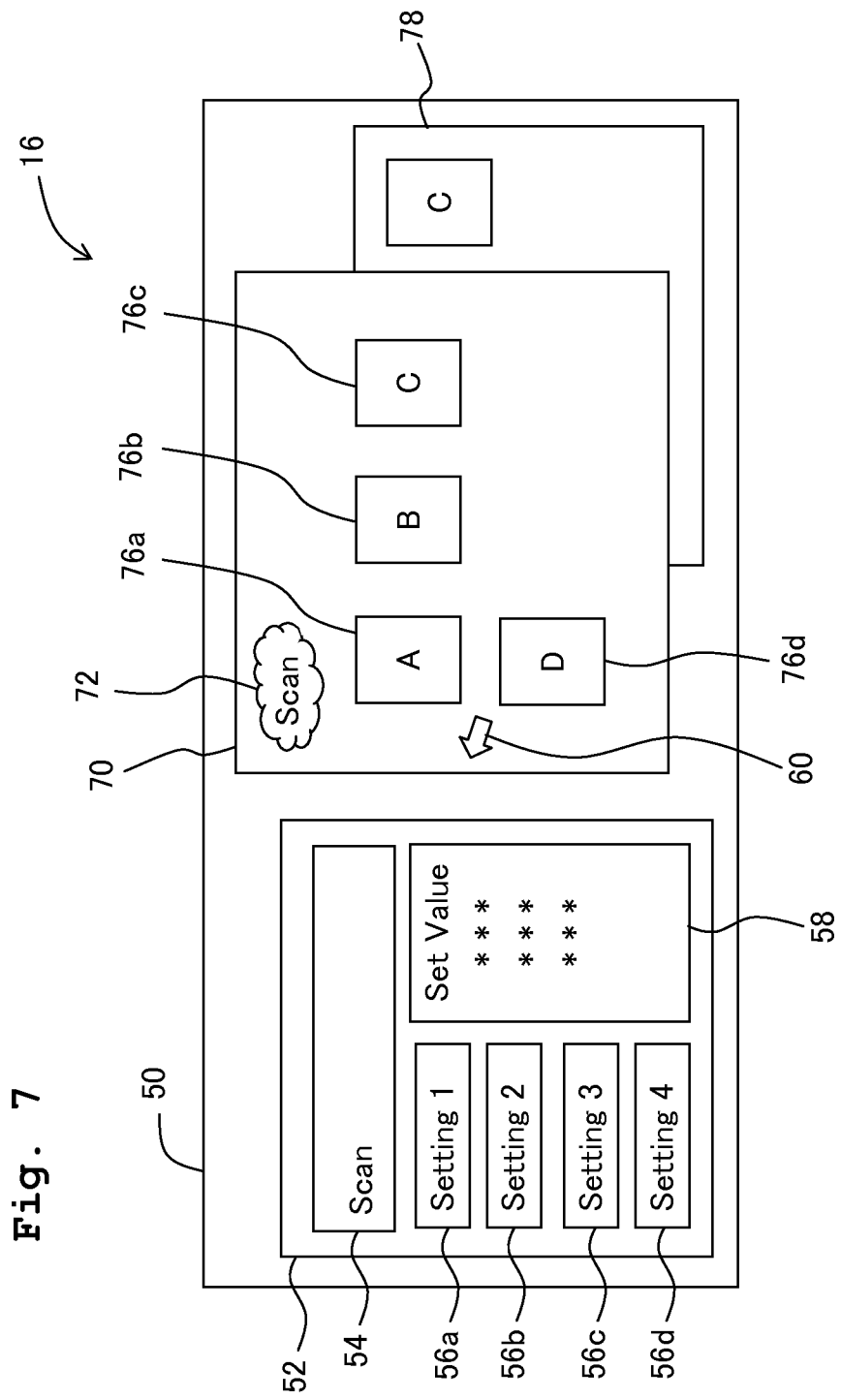
FIG. 7 is a diagram showing a state of the first preview window being active among the first preview window and the second preview window.

In detail, by carrying out the left click on the first preview screen 70 being displayed under the second preview screen 78, the first preview screen 70 becomes an active window and, as shown in FIG. 7, the first preview screen 70 is displayed upon the second preview screen 78. On this occasion, the successive scan icon 72 is displayed again in the first preview screen 70. Then, the successive scan icon 82 of the second preview screen 78 is no longer displayed. In this manner, if a plurality of preview screens are displayed on the display screen 50, then the PC 10 displays the successive scan icon in only the screen being an active window among the plurality of preview screens. By virtue of this, it is possible to swiftly carry out the successive scanning process in the preview screen being an active window.

Further, in the successive scanning process described above, while the process is carried out via the left click on the successive scan icon, it is also possible to carry out the successive scanning process via a drag operation on the successive scan icon. In detail, as shown in FIG. 8 for example, if the second preview screen 78 is an active window, then the scan command is sent to the scanner 30 via a mouse operation to move the pointer 60 onto the successive scan icon 82 of the second preview screen 78 and, with the left click being carried on, to further move the pointer 60 onto the first preview screen 70. On this occasion, the set value stored in association with the second preview screen 78 is adopted as the set value for the scanning process to be sent together with the scan command.

On receiving a predetermined set value and the scan command, the scanner 30 carries out a scanning process according to that set value, and transmits to the PC 10 the scan data generated through the scanning process. On receiving the scan data, the PC 10 lets the data storage area 28 store the received scan data as a scan data group. On this occasion, the data storage area 28 stores the received scan data group being associated with the existing scan data of the images displayed in the first preview screen 70. In this manner, on the PC 10, by carrying out the drag operation on the successive scan icon, it is possible to carry out the successive scanning process on the preview screen of the drag destination. However, in the successive scanning process through the drag operation, the successive scanning process is carried out according to the set value stored in association with the preview screen of the drag origin.

<Control Program>

The successive scanning process described above is carried out by letting the CPU 12 of the PC 10 execute the control program 26. Hereinbelow, using FIGS. 9A to 9E, an explanation will be made on a flow for the CPU 12 to execute the control program 26. Further, this flow of the program is executed repetitively until an operation is carried out to select an unshown exit button in the main screen 52.

Figure 9A:
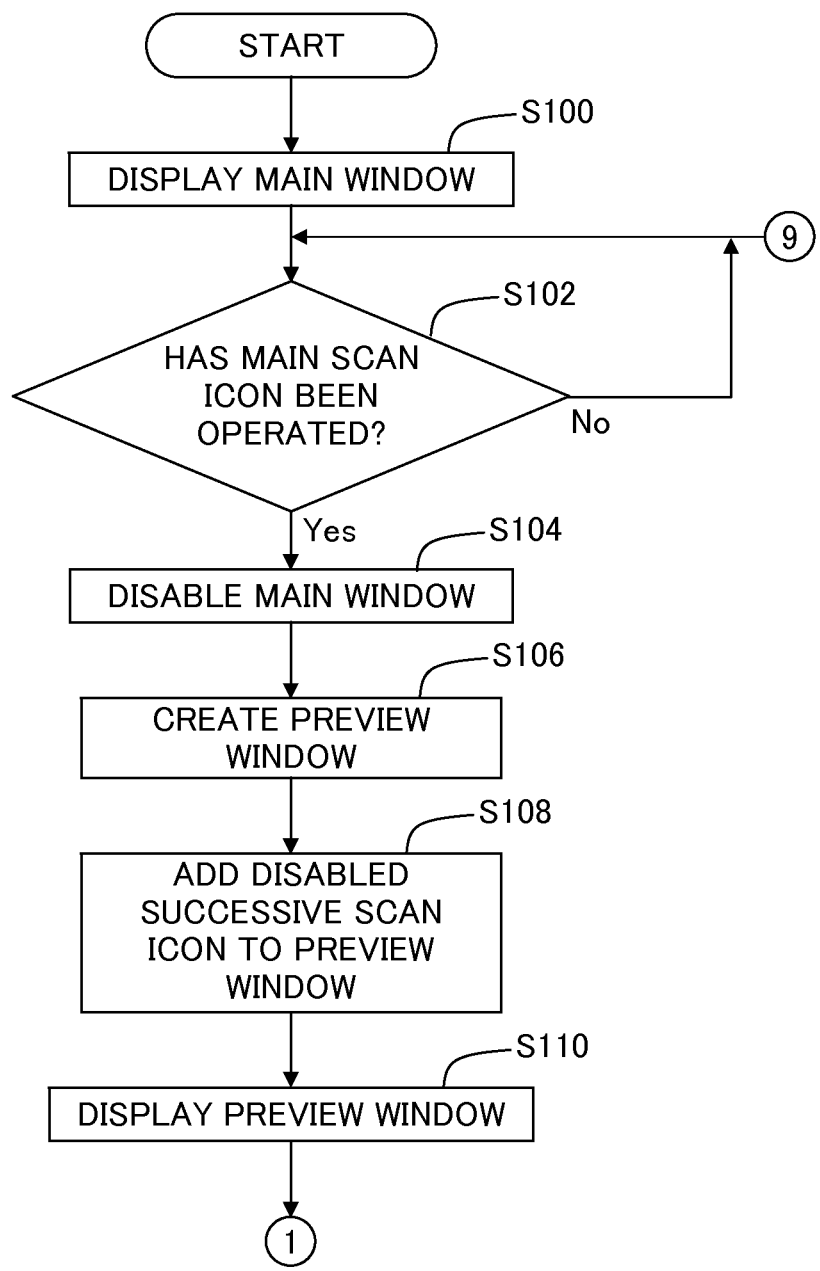
FIGS. 9A to 9E show a flowchart showing an operation of a PC.
Figure 9B:
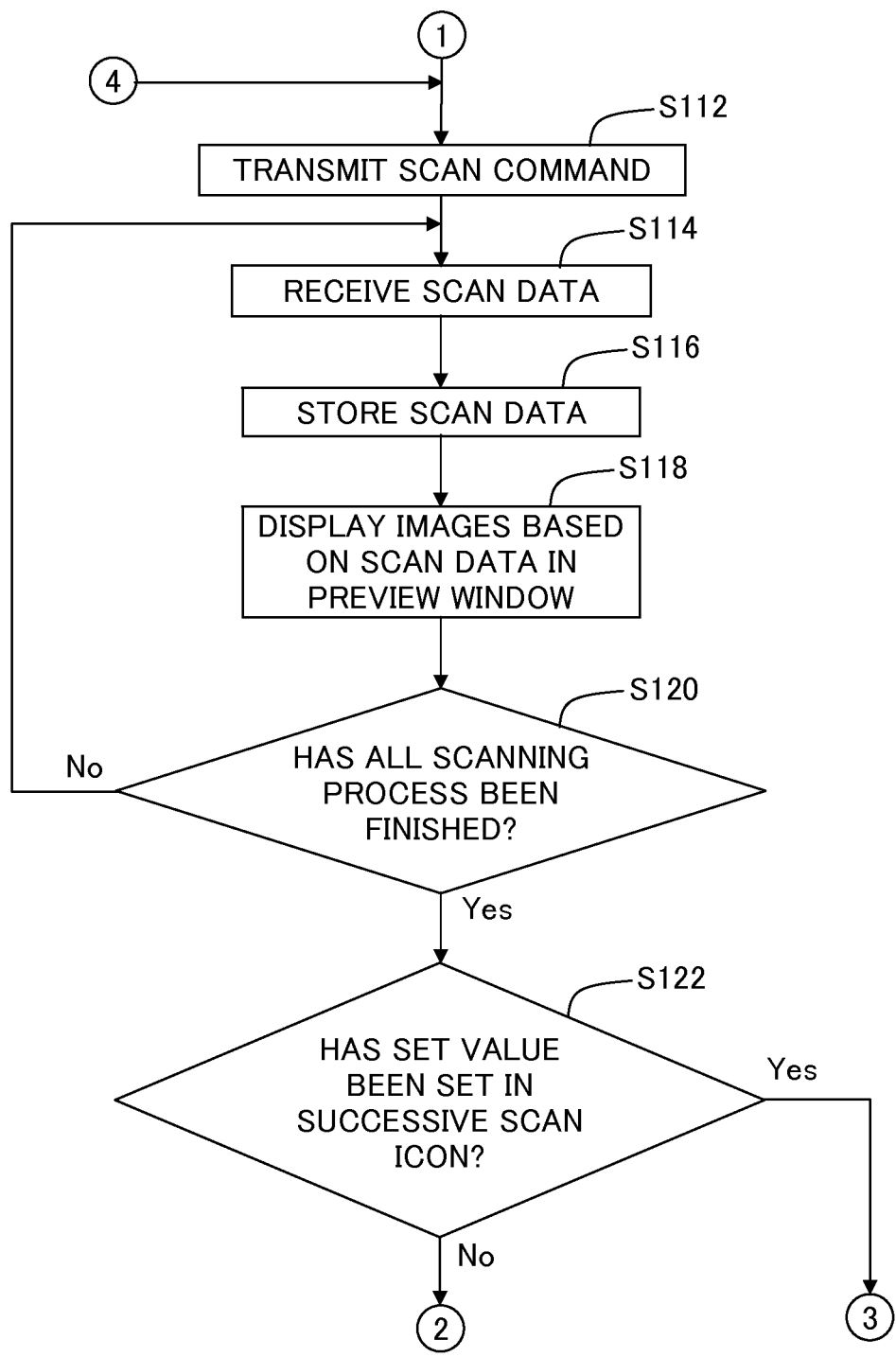
Figure 9C:
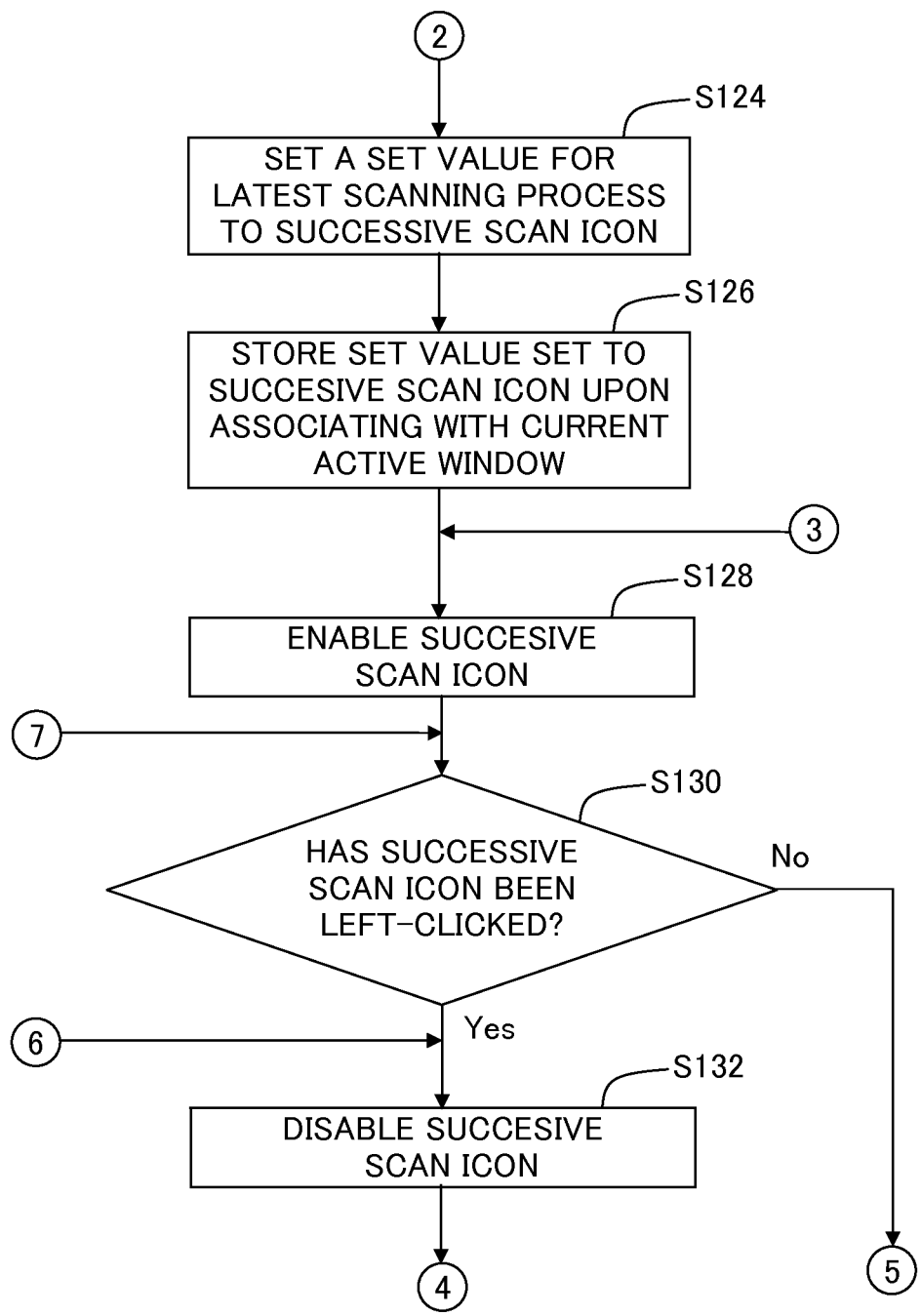
Figure 9D:
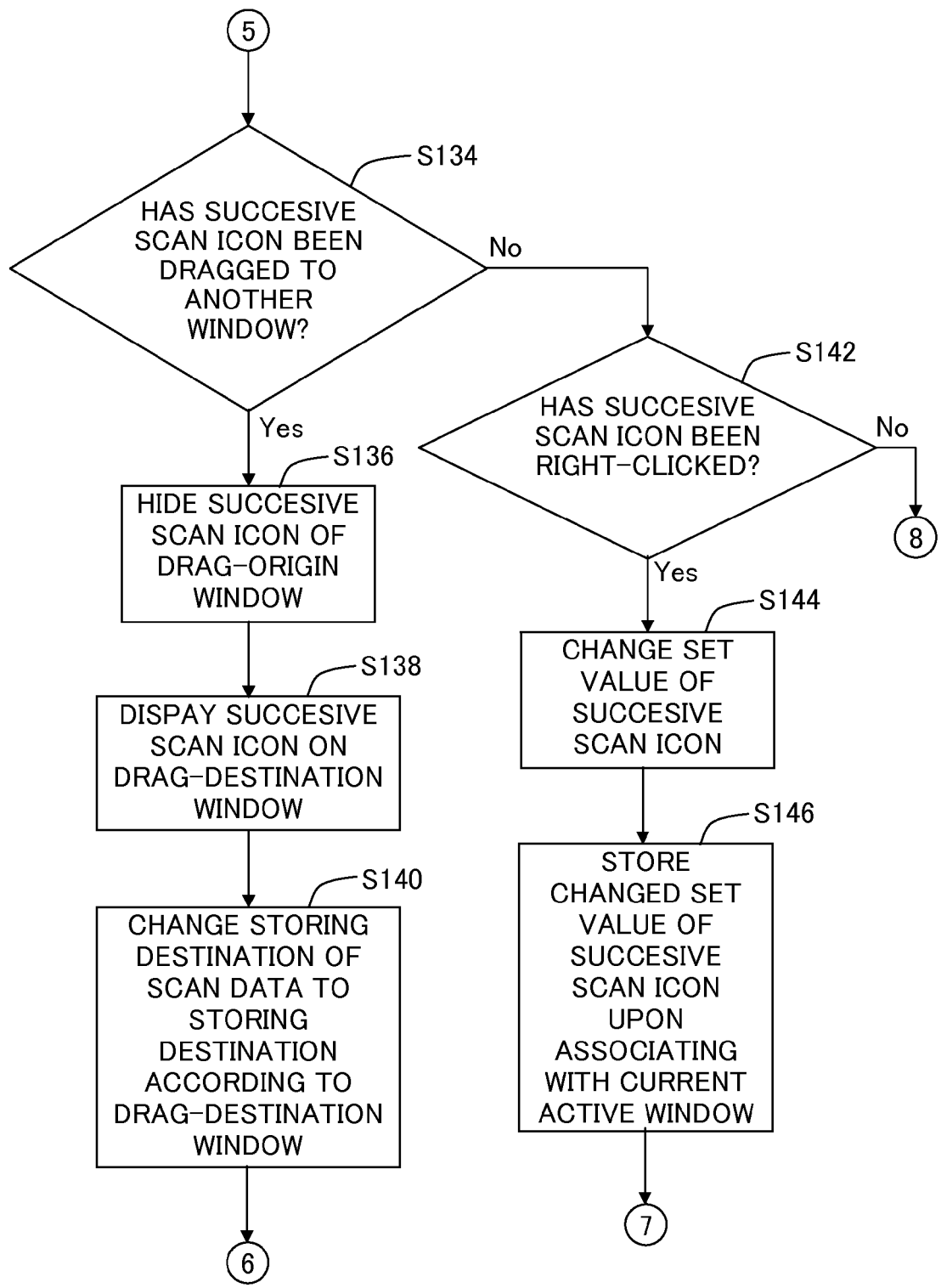
Figure 9E:
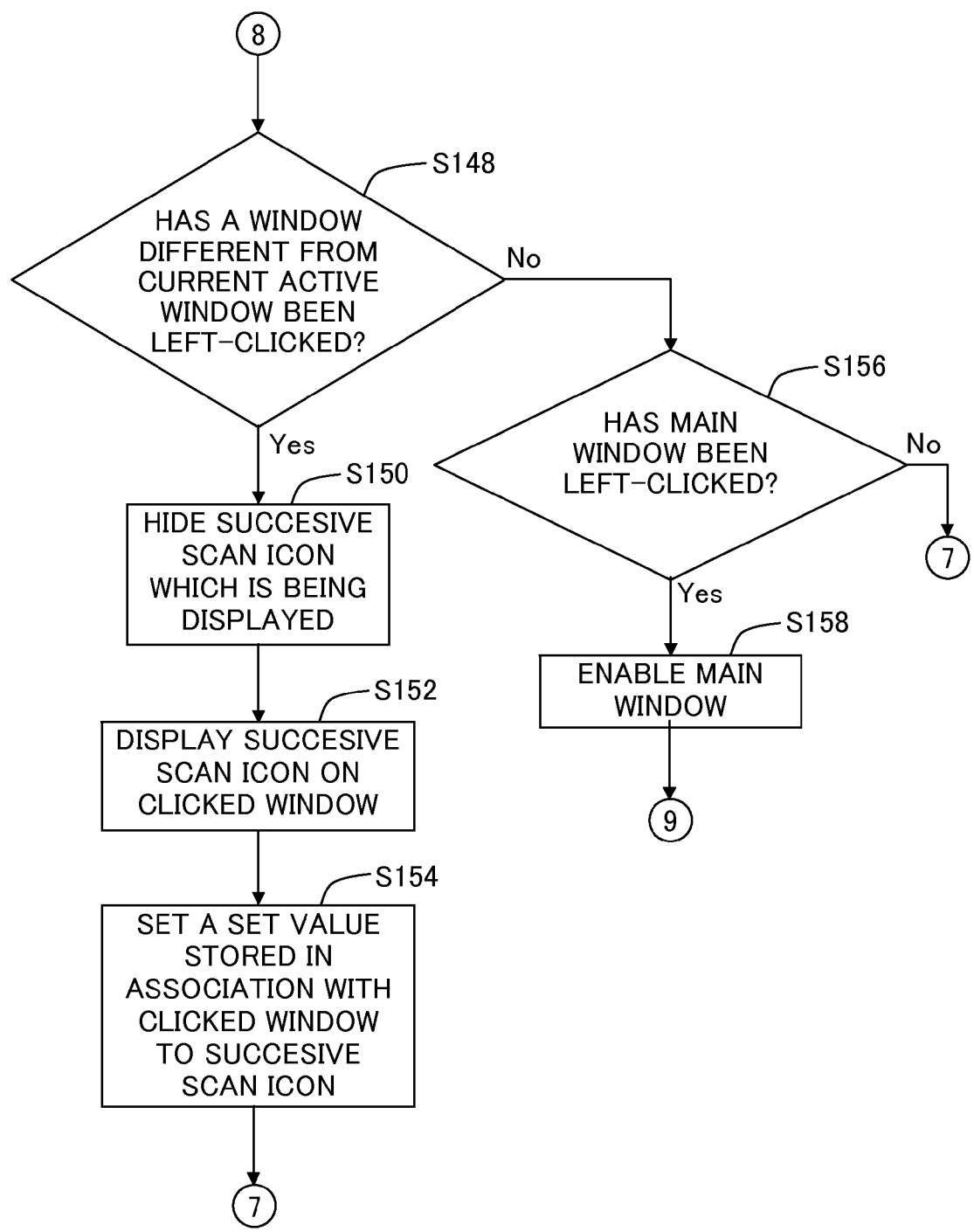

If the control program 26 is executed, then as shown in FIG. 9A, the main screen 52 is displayed on the display screen 50 of the panel 16 of the PC 10 (step 100; the word "step" will be abbreviated as "S", below). Next, the CPU 12 determines whether or not the left click is carried out on the main scan icon 54 of the main screen 52 (S102). If the left click is not carried out on the main scan icon 54 (S102: No), then the process of S102 is repeated. On the other hand, if the left click is carried out on the main scan icon 54 (S102: Yes), then the main screen 52 is disabled (S104).

Subsequently, an image data is created for the preview screen (S106), and an image data for the disabled successive scan icon is added to the formal image data (S108). Then, based on the image data, the preview screen is displayed on the display screen 50 of the panel 16 (S110). Subsequently, the scan command is sent to the scanner 30 (S112). On this occasion, the scan command is sent to the scanner 30, together with the set value for the scanning process stored in association with the preview screen.

On transmitting the scan command, the PC 10 receives a scan data from the scanner 30, as the reply to the scan command (S114). Then, the PC 10 lets the data storage area 28 store the received scan data as a scan data group (S116), and then lets the preview screen display the images 76 based on the received scan data (S118). Next, the CPU 12 determines whether or not the scanning processes are all finished (S120). If the scanning processes are not all finished (S120: No), then the process returns to S114.

On the other hand, if the scanning processes are all finished (S120: Yes), then the CPU 12 determines whether or not a set value for the scanning process is set in the successive scan icon (S122). If no set value is set in the successive scan icon (S122: No), then the set value for the scanning process of the latest images displayed in the preview screen is set as the set value of the successive scan icon (S124). Then, the set value set in the successive scan icon is associated with the preview screen being the current active window, and then stored in the data storage area 28 (S126). Then, the process proceeds to S128. On the other hand, if a set value is set in the successive scan icon (S122: Yes), then the process of S124 and S126 is skipped to let the process proceed to S128.

In S128, the PC 10 enables the successive scan icon (S128). Then, the CPU 12 determines whether or not the left click is carried out on the successive scan icon (S130). If the left click is carried out on the successive scan icon (S130: Yes), then the PC 10 disables the successive scan icon (S132). Then, the process returns to S112.

Further, if the left click is not carried out on the successive scan icon (S130: No), then the CPU 12 determines whether or not the successive scan icon is moved to another preview screen through a drag operation (S134). If the successive scan icon is moved to another preview screen through a drag operation (S134: Yes), then the successive scan icon is no longer displayed in the preview screen before the drag (S136). Next, the successive scan icon is displayed again in the preview screen of the drag destination (S138). Subsequently, the place for saving the scan data is changed to that according to the preview screen of the drag destination (S140). Then, the process is carried out from S132.

Further, if the successive scan icon is not moved to another preview screen through a drag operation (S134: No), then the CPU 12 determines whether or not the right click is carried out on the successive scan icon (S142). If the right click is carried out on the successive scan icon (S142: Yes), then the setting alteration buttons 77a and 77b are displayed on the display screen 50, and the set value of the successive scan icon is changed to the set value according to the selected one of the setting alteration buttons 77a and 77b (S144). Next, the changed set value is associated with the currently active preview screen, and then stored in the data storage area 28 (S146). Then, the process is carried out from S130.

Further, if the right click is not carried out on the successive scan icon (S142: No), then the CPU 12 determines whether or not the left click is carried out on a different preview screen from the currently active preview screen (S148). If the left click is carried out on a different preview screen from the currently active preview screen (S148: Yes), then the successive scan icon in display is no longer displayed (S150). Next, the successive scan icon is displayed in the preview screen on which the click is carried out (S152). Subsequently, the set value, which is stored in association with the preview screen on which the click has been carried out, is set to the successive scan icon (S154). Then, the process is carried out from S130.

Further, if the left click is not carried out on a different preview screen from the currently active preview screen (S148: No), then the CPU 12 determines whether or not the left click is carried out on the main screen 52 (S156). If the left click is carried out on the main screen 52 (S156: Yes), then the PC 10 enables the main screen 52 (S158). Then, the process is carried out from S102. On the other hand, if the left click is not carried out on the main screen 52 (S156: No), then the process is carried out from S130.

Further, the present teaching is not limited to the above embodiment, but is practicable in various forms with various changes and/or improvements based on the knowledge of those skilled in the art. In particular, in the above embodiment for example, if the display screen 50 displays a plurality of preview screens, then the successive scan icon is displayed only in the active preview screen among the plurality of preview screens. However, it is possible to display the successive scan icon in each of the plurality of preview screens.

Further, in the above embodiment, the PC 10 is adopted as an apparatus for carrying out the successive scanning process. However, it is also possible to adopt a mobile terminal such as a smartphone or the like. Further, the mouse 18 is adopted as an operation unit for carrying out the operation of selecting the main scan icon 54 and the like. However, it is possible to adopt a manual operation button, a touch screen, or the like. In such cases, it is possible to carry out the selecting operation by a tap or the like instead of a left click.

Further, while the scan data is saved either in JPEG format or in PDF format in the above embodiment, it may be in other data formats. For example, BMP, TIFF, and the like may be applied. When those data formats are adopted, if a plurality of scan data can be stored in one file, then they may be treated as similar to PDF, whereas if not, then they may be treated as similar to JPEG.

Further, in the above embodiment, the explanation was made with an example for the CPU 12 to carry out the processes shown in FIGS. 9A to 9E, etc. However, without being limited to the CPU 12, either an ASIC or other logic integrated circuits may carry out those processes. Further, a CPU or the like may cooperate with an ASIC or other logic integrated circuits to carry out those processes.

What is claimed is:

1. A non-transitory computer-readable medium storing computer-executable programs that, when executed by a processor, cause an information processing apparatus comprising: a display unit; an operation unit configured to output a signal depending on a user operation; and a communication unit configure to communicate with a scanner, to perform:

displaying a first window on the display unit, the first window including a first icon which causes the scanner to execute scanning process;

judging whether a selection operation to the first icon is performed based on the signal outputted from the operation unit;

in a case that the information processing apparatus judges that the selection operation to the first icon is performed, transmitting a scan instruction to the scanner via the communication unit;

receiving scan data from the scanner via the communication unit as a response to the scan instruction;

displaying a second window on the display unit, the second window displaying an image based on the scan data received from the scanner and including a second icon which cases the scanner to execute successive scanning process; and judging whether a selection operation to the second icon is performed based on the signal outputted from the operation unit, wherein in a case that the information processing apparatus judges that second selection operation to the first icon is performed after displaying the second window on the display unit, the programs cause the information processing apparatus to display another second window on the display unit together with the second window which has been displayed on the display unit, the another second window displaying another image based on another scan data generated by the scanning process executed after the second selection operation to the first icon, and in a case that the information processing apparatus judges that the selection operation to the second icon is performed after displaying the second window on the display unit, the programs cause the information processing apparatus to display a successive image on the second window together with the image which has been displayed on the second window, the successive image being based on successive scan data generated by the successive scanning process executed after the selection operation to the second icon.

2. The non-transitory computer-readable medium according to claim 1, wherein the information processing apparatus further comprises a storage unit, the programs cause the information processing apparatus to further perform storing the scan data and the successive scan data in the storage unit, and the programs cause the information processing apparatus to display the second window including the image based on the scan data stored in the storage unit and the successive image based on the successive scan data stored in the storage unit.

3. The non-transitory computer-readable medium according to claim 2, wherein the programs cause the information processing apparatus to store the successive scan data in association with the scan data in the storage unit.

4. The non-transitory computer-readable medium according to claim 3, wherein the programs cause the information processing apparatus to store the successive scan data and the scan data in a same folder in the storage unit.

5. The non-transitory computer-readable medium according to claim 3, wherein the programs cause the information processing apparatus to store the successive scan data in a state of being merged into the scan data in the storage unit.

6. The non-transitory computer-readable medium according to claim 2, wherein the programs cause the information processing apparatus to further perform storing a set value for the successive scanning process in association with the second window in the storage unit, and in a case that the information processing apparatus judges that the selection operation to the second icon is performed after displaying the second window on the display unit, the programs cause the information processing apparatus to transmit, to the scanner via the communication unit, a successive scan command according to the set value for the successive scan process stored in the storage unit in association with the second window.

7. The non-transitory computer-readable medium according to claim 6, wherein in a case that the information processing apparatus judges that the selection operation to the first icon is performed after displaying the first window on the display unit, the programs cause the information processing apparatus to store a set value for the scanning process executed after the selection operation to the first icon, as the set value for the successive scanning process, in association with the second window in the storage unit, in a case that the information processing apparatus judges that the second selection operation to the first icon is performed after displaying the second window on the display unit, the programs cause the information processing apparatus to store a set value for the scanning process executed after the second selection operation to the first icon, as the set value for the successive scanning process, in association with the another second window in the storage unit, and in a case that the information processing apparatus judges that the selection operation to the second icon is performed after displaying the second window on the display unit, the programs cause the information processing apparatus to store a set value for the successive scanning process executed after the selection operation to the second icon, in association with the second window in the storage unit.

8. The non-transitory computer-readable medium according to claim 7, wherein the programs cause the information processing apparatus to display the second icon in only one of the second window and the another second window in a case of displaying the second window and the another second window on the display unit, the programs cause the information processing apparatus to further perform judging whether a drag operation is performed to move the second icon from the one of the second window and the another second window to the other of the second window and the another second window, based on the signal outputted from the operation unit, and in a case that the information processing apparatus judges that the drag operation is performed, the programs cause the information processing apparatus to transmit, to the scanner via the communication unit, the successive scan command according to the set value for the successive scanning process stored in the storage unit in association with the one of the second window and the another second window, after moving the second icon from the one of the second window and the another second window to the other of the second window and the another second window.

9. The non-transitory computer-readable medium according to claim 8, wherein in a case that the second window and the another second window are displayed on the display unit, the programs cause the information processing apparatus to display the second icon in one of the second window and the another second window which is active.

10. The non-transitory computer-readable medium according to claim 1,
wherein the programs cause the information processing apparatus to display the second icon in only one of the second window and the another second window in a case of displaying the second window and the another second window on the display unit,
the programs cause the information processing apparatus to further perform judging whether a drag operation is performed to move the second icon from the one of the second window and the another second window to the other of the second window and the another second window, based on the signal outputted from the operation unit, and
in a case that the information processing apparatus judges that the drag operation is performed, the programs cause the information processing apparatus to transmit, to the scanner via the communication unit, the successive scan command for executing the successive scanning process.

11. An information processing apparatus comprising:
a display unit;
an operation unit configured to output a signal depending on a user operation;
a communication unit configure to communicate with a scanner; and
a controller configured to:
display a first window on the display unit, the first window including a first icon which causes the scanner to execute scanning process;
judge whether a selection operation to the first icon is performed based on the signal outputted from the operation unit;
in a case that the controller judges that the selection operation to the first icon is performed, transmit a scan instruction to the scanner via the communication unit;
receive scan data from the scanner via the communication unit as a response to the scan instruction;
display a second window on the display unit, the second window displaying an image based on the scan data received from the scanner and including a second icon which cases the scanner to execute successive scanning process; and
judging whether a selection operation to the second icon is performed based on the signal outputted from the operation unit,
wherein in a case that the controller judges that second selection operation to the first icon is performed after displaying the second window on the display unit, the controller is configured to display another second window on the display unit together with the second window which has been displayed on the display unit, the another second window displaying another image based on another scan data generated by the scanning process executed after the second selection operation to the first icon, and in a case that the information processing apparatus judges that the selection operation to the second icon is performed after displaying the second window on the display unit, the programs cause the information processing apparatus to display a successive image on the second window together with the image which has been displayed on the second window, the successive image being based on successive scan data generated by the successive scanning process executed after the selection operation to the second icon.

12. An information processing method to be executed by an information processing apparatus provided with: a display unit; an operation unit configured to output a signal depending on a user operation; and a communication unit configure to communicate with a scanner, the method comprising:

displaying a first window on the display unit, the first window including a first icon which causes the scanner to execute scanning process;

judging whether a selection operation to the first icon is performed based on the signal outputted from the operation unit;

in a case that the information processing apparatus judges that the selection operation to the first icon is performed, transmitting a scan instruction to the scanner via the communication unit;

receiving scan data from the scanner via the communication unit as a response to the scan instruction;

displaying a second window on the display unit, the second window displaying an image based on the scan data received from the scanner and including a second icon which cases the scanner to execute successive scanning process; and judging whether a selection operation to the second icon is performed based on the signal outputted from the operation unit, wherein in a case that the information processing apparatus judges that second selection operation to the first icon is performed after displaying the second window on the display unit, the information processing apparatus displays another second window on the display unit together with the second window which has been displayed on the display unit, the another second window displaying another image based on another scan data generated by the scanning process executed after the second selection operation to the first icon, and in a case that the information processing apparatus judges that the selection operation to the second icon is performed after displaying the second window on the display unit, the programs cause the information processing apparatus to display a successive image on the second window together with the image which has been displayed on the second window, the successive image being based on successive scan data generated by the successive scanning process executed after the selection operation to the second icon.

13. The method according to claim 12,
wherein the information processing apparatus further comprises a storage unit,
the method further comprising storing the scan data and the successive scan data in the storage unit, and
the information processing apparatus displays the second window including the image based on the scan data stored in the storage unit and the successive image based on the successive scan data stored in the storage unit.

* * * * *